United States Patent
Chen et al.

(10) Patent No.: US 9,515,807 B2
(45) Date of Patent: Dec. 6, 2016

(54) UPLINK INTERFERENCE MANAGEMENT METHOD, NODE, AND SYSTEM

(71) Applicant: Huawei Technologies Co., Ltd., Shenzhen, Guangdong (CN)

(72) Inventors: Dong Chen, Shanghai (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 14/599,292

(22) Filed: Jan. 16, 2015

(65) Prior Publication Data
US 2015/0131631 A1 May 14, 2015

Related U.S. Application Data

(63) Continuation of application No. PCT/CN2012/078771, filed on Jul. 17, 2012.

(51) Int. Cl.
*H04L 5/00* (2006.01)
*H04W 24/02* (2009.01)
(Continued)

(52) U.S. Cl.
CPC ............ *H04L 5/0073* (2013.01); *H04J 11/005* (2013.01); *H04J 11/0036* (2013.01); *H04L 1/00* (2013.01); *H04L 5/005* (2013.01); *H04W 24/02* (2013.01); *H04W 48/00* (2013.01); *H04W 72/0413* (2013.01); *H04W 72/0426* (2013.01); *H04J 2211/001* (2013.01); *H04W 84/045* (2013.01)

(58) Field of Classification Search
None
See application file for complete search history.

(56) References Cited

U.S. PATENT DOCUMENTS 7,266,096 B2* 9/2007 Miya .................... H04W 52/12
370/320
9,253,794 B2* 2/2016 Manssour ......... H04W 72/1252
(Continued)

FOREIGN PATENT DOCUMENTS

| CN | 102202353 A | 9/2011 |
|---|---|---|
| CN | 102356657 A | 2/2012 |

(Continued)

OTHER PUBLICATIONS

"3rd Generation Partnership Project; Technical Specification Group Radio Access Network; UTRAN Iur interface Radio Network Subsystem Application Part (RNSAP) signalling (Release 11)", 3GPP TS 25.423 V10.2.0, Jun. 2012, 1,157 pages.

(Continued)

*Primary Examiner* — Hong Cho

(57) ABSTRACT

Embodiments of the present application provide an uplink interference management method, node, and system, which relate to the field of wireless communications and can reduce interference caused by a macro cell UE to an adjacent micro cell, thereby improving an uplink capacity of the micro cell. The method of the present application includes: receiving, by a micro cell node, an interference cancellation request sent by a macro cell node, where the interference cancellation request includes uplink configuration information of a user equipment (UE), uplink scrambling code information of the UE, and location information for determining an uplink dedicated physical control channel (DPCCH) of the UE; and cancelling interference according to the interference cancellation request. The embodiments of the present application are mainly used in a process of cancelling the interference caused by the macro cell UE to the micro cell.

16 Claims, 4 Drawing Sheets

```
┌─────────────────────────────────────────────────────┐
│ A micro cell node receives an interference         │
│ cancellation request sent by a macro cell node,    │──101
│ where the interference cancellation request        │
│ includes uplink configuration information of a     │
│ user equipment (UE), uplink scrambling code        │
│ information of the UE, and location information    │
│ for determining an uplink dedicated physical       │
│ control channel (DPCCH) of the UE                  │
└─────────────────────────────────────────────────────┘
                         │
                         ▼
      ┌──────────────────────────────────────┐
      │ Cancel interference according to the │──102
      │    interference cancellation request │
      └──────────────────────────────────────┘
```

(51) Int. Cl.
*H04L 1/00* (2006.01)
*H04W 48/00* (2009.01)
*H04W 72/04* (2009.01)
*H04J 11/00* (2006.01)
*H04W 84/04* (2009.01)

(56) References Cited

U.S. PATENT DOCUMENTS

| | | | |
|---|---|---|---|
| 2007/0121554 A1* | 5/2007 | Luo | H04B 1/7107 370/335 |
| 2009/0196162 A1 | 8/2009 | Sambhwani et al. | |
| 2010/0238888 A1* | 9/2010 | Sampath | H04W 24/02 370/329 |
| 2010/0238901 A1* | 9/2010 | Sampath | H04W 24/02 370/331 |
| 2010/0240382 A1* | 9/2010 | Sampath | H04W 24/02 455/450 |
| 2012/0135743 A1* | 5/2012 | Ebiko | H04W 72/082 455/452.2 |

FOREIGN PATENT DOCUMENTS

| | | |
|---|---|---|
| CN | 102469466 A | 5/2012 |
| EP | 2 627 141 A2 | 8/2013 |

OTHER PUBLICATIONS

"3rd Generation Partnership Project; Technical Specification Group Radio Access Network; UTRAN Iub interface Node B Application Part (NBAP) signalling (Release 10)", 3GPP TS 25.433 V10.6.0, Jun. 2012, 1,284 pages.

\* cited by examiner

UPLINK INTERFERENCE MANAGEMENT METHOD, NODE, AND SYSTEM

CROSS-REFERENCE TO RELATED APPLICATIONS

This application is a continuation of International Application No. PCT/CN2012/078771, filed on Jul. 17, 2012, which is hereby incorporated by reference in its entirety.

TECHNICAL FIELD

The present application relates to the field of wireless communications, and in particular, to an uplink interference management method, node, and system.

BACKGROUND

The field of wireless communications is confronted with pressure of explosive growth of data services. To increase a network capacity and reduce transmission costs, a heterogeneous network (Hetnet) technology is proposed in the industry. A Hetnet is formed by multiple cells of different sizes and different types, including a macro cell and a micro cell, where the micro cell includes a micro cell, a pico cell, a femto cell, a cell in a remote radio head (RRH) shape, and the like. Deploying more micro cells for an area with dense traffic can effectively improve a network capacity in the area. In addition, because a scale of the micro cell is relatively small, both capital expenditure (Capex) and operating expense (Opex) of the micro cell are relatively low. Therefore, the Hetnet receives attention from a lot of operators and becomes an important direction of wireless network evolution.

As shown in FIG. 1, FIG. 1 is a typical network deployment manner of the Hetnet. In this network deployment manner, a user equipment (UE) performs normal uplink signal transmission after establishing a connection to a macro cell.

In a process of implementing the Hetnet, the prior art has the following disadvantages: When a UE that accesses a macro cell enters an uplink coverage area of a micro cell but has not established a connection to the micro cell, the micro cell may receive an uplink signal transmitted by the macro cell UE because the UE is in the uplink coverage area of the micro cell; therefore, the uplink signal of the macro cell UE may cause severe uplink interference on the micro cell, thereby affecting receiving and demodulation of an uplink signal of a micro cell UE, and causing a reduction of an uplink capacity of the micro cell.

SUMMARY

Embodiments of the present application provide an uplink interference management method, node, and system, which can reduce interference caused by a macro cell UE on a micro cell, thereby improving an uplink capacity of the micro cell.

A first aspect of the present application provides an uplink interference management method, including:

receiving, by a micro cell node, an interference cancellation request sent by a macro cell node, where the interference cancellation request includes uplink configuration information of a user equipment (UE), uplink scrambling code information of the UE, and location information for determining an uplink dedicated physical control channel (DPCCH) of the UE; and cancelling interference according to the interference cancellation request.

With reference to the first aspect, in a possible implementation manner, the cancelling interference according to the interference cancellation request includes:

detecting, according to the uplink configuration information, the uplink scrambling code information of the UE, and the location information for determining the uplink DPCCH of the UE that are included in the interference cancellation request, an uplink signal of the UE corresponding to the interference cancellation request; and cancelling the uplink signal of the UE corresponding to the interference cancellation request from received uplink signals.

With reference to the first aspect and the foregoing possible implementation manner, in another possible implementation manner, the UE is a UE that is determined by the macro cell node to cause uplink interference to a micro cell.

With reference to the first aspect and the foregoing possible implementation manners, in another possible implementation manner, the uplink configuration information includes at least one of the following: timeslot format information of the uplink DPCCH, configuration information of an enhanced dedicated physical control channel (E-DPCCH), and configuration information of discontinuous sending; and the location information for determining the uplink DPCCH of the UE includes at least one of the following: a timing difference between the uplink DPCCH of the UE and a common pilot channel of the micro cell, and a timing difference between a downlink DPCCH of the UE and the common pilot channel of the micro cell.

With reference to the first aspect and the foregoing possible implementation manners, in another possible implementation manner, before the receiving an interference cancellation request sent by a macro cell node, the method further includes:

sending an interference management request and/or a periodic interference management request to the macro cell node, where:

the macro cell node triggers sending of the interference cancellation request under any one of the following conditions: the macro cell node receives the interference management request sent by the micro cell node; the macro cell node receives the periodic interference management request sent by the micro cell node; and the macro cell node determines that the UE causes uplink interference to the micro cell.

With reference to the first aspect and the foregoing possible implementation manners, in another possible implementation manner, after the detecting an uplink signal of the UE corresponding to the interference cancellation request, the method further includes:

performing, when an uplink interference severity is higher than a predefined threshold, the cancelling the uplink signal of the UE from received uplink signals.

With reference to the first aspect and the foregoing possible implementation manners, in another possible implementation manner, after the receiving an interference cancellation request sent by a macro cell node, the method further includes:

sending an interference cancellation response to the macro cell node, so that the macro cell node performs, according to the interference cancellation response, an operation of further reducing interference.

With reference to the first aspect and the foregoing possible implementation manners, in another possible implementation manner, before the receiving an interference cancellation request sent by a macro cell node, the method further includes:

sending capability information of supporting interference cancellation to the macro cell node.

A second aspect of the present application provides an uplink interference management method, including:

sending, by a macro cell node, an interference cancellation request to a micro cell node, so that the micro cell node cancels interference according to the interference cancellation request, where:

the interference cancellation request includes uplink configuration information of a user equipment (UE), uplink scrambling code information of the UE, and location information for determining an uplink dedicated physical control channel (DPCCH) of the UE.

With reference to the second aspect, in a possible implementation manner, the sending an interference cancellation request to a micro cell node includes:

determining a UE that causes uplink interference to a micro cell; and sending the interference cancellation request to the micro cell node according to a result of the determining, where the interference cancellation request includes uplink configuration information of the UE that causes uplink interference to the micro cell, uplink scrambling code information of the UE that causes uplink interference to the micro cell, and location information for determining an uplink DPCCH of the UE that causes uplink interference to the micro cell.

With reference to the second aspect and the foregoing possible implementation manner, in another possible implementation manner, the uplink configuration information includes at least one of the following: timeslot format information of the uplink DPCCH, configuration information of an enhanced dedicated physical control channel (E-DPCCH), and configuration information of discontinuous sending; and the location information for determining the uplink DPCCH of the UE includes at least one of the following: a timing difference between the uplink DPCCH of the UE and a common pilot channel of the micro cell, and a timing difference between a downlink DPCCH of the UE and the common pilot channel of the micro cell.

With reference to the second aspect and the foregoing possible implementation manners, in another possible implementation manner, sending of the interference cancellation request is triggered in any one of the following cases:

an interference management request sent by the micro cell node is received; or a periodic interference management request sent by the micro cell node is received; or it is determined that the UE causes uplink interference to the micro cell.

With reference to the second aspect and the foregoing possible implementation manners, in another possible implementation manner, after the sending an interference cancellation request to a micro cell node, the method further includes:

receiving an interference cancellation response sent by the micro cell node; and performing, according to the interference cancellation response, an operation of further reducing interference.

With reference to the second aspect and the foregoing possible implementation manners, in another possible implementation manner, before the sending an interference cancellation request to a micro cell node, the method further includes:

receiving capability information of supporting interference cancellation sent by the micro cell node; and sending an interference cancellation request to a micro cell node in a case in which the micro cell node supports interference cancellation.

A third aspect of the present application provides a micro cell node, including:

a receiving unit, configured to receive an interference cancellation request sent by a macro cell node, where the interference cancellation request includes uplink configuration information of a user equipment (UE), uplink scrambling code information of the UE, and location information for determining an uplink dedicated physical control channel (DPCCH) of the UE; and a cancelling unit, configured to cancel interference according to the interference cancellation request.

With reference to the third aspect, in a possible implementation manner, the cancelling unit includes:

a detecting module, configured to detect, according to the uplink configuration information, the uplink scrambling code information of the UE, and the location information for determining the uplink DPCCH of the UE that are included in the interference cancellation request, an uplink signal of the UE corresponding to the interference cancellation request; and a cancelling module, configured to cancel the uplink signal of the UE corresponding to the interference cancellation request from received uplink signals.

With reference to the third aspect and the foregoing possible implementation manner, in another possible implementation manner, the UE is a UE that is determined by the macro cell node to cause uplink interference to a micro cell.

With reference to the third aspect and the foregoing possible implementation manners, in another possible implementation manner, the uplink configuration information includes at least one of the following: timeslot format information of the uplink DPCCH, configuration information of an enhanced dedicated physical control channel (E-DPCCH), and configuration information of discontinuous sending; and the location information for determining the uplink DPCCH of the UE includes at least one of the following: a timing difference between the uplink DPCCH of the UE and a common pilot channel of the micro cell, and a timing difference between a downlink DPCCH of the UE and the common pilot channel of the micro cell.

With reference to the third aspect and the foregoing possible implementation manners, in another possible implementation manner, the micro cell node further includes:

a response unit, configured to send an interference cancellation response to the macro cell node after the receiving unit receives the interference cancellation request sent by the macro cell node, so that the macro cell node performs, according to the interference cancellation response, an operation of further reducing interference.

With reference to the third aspect and the foregoing possible implementation manners, in another possible implementation manner, the micro cell node further includes:

a capability unit, configured to send, before the receiving unit receives the interference cancellation request sent by the macro cell node, capability information of supporting interference cancellation to the macro cell node.

A fourth aspect of the present application provides a macro cell node, including:

a sending unit, configured to send an interference cancellation request to a micro cell node, so that the micro cell node cancels interference according to the interference cancellation request, where:

the interference cancellation request includes uplink configuration information of a user equipment (UE), uplink scrambling code information of the UE, and location information for determining an uplink dedicated physical control channel (DPCCH) of the UE.

With reference to the fourth aspect, in a possible implementation manner, the sending unit includes:

a determining module, configured to determine a UE that causes uplink interference to a micro cell; and a sending module, configured to send the interference cancellation request to the micro cell node according to a result of the determining obtained by the determining module, where the interference cancellation request includes uplink configuration information of the UE that causes uplink interference to the micro cell, uplink scrambling code information of the UE that causes uplink interference to the micro cell, and location information for determining an uplink DPCCH of the UE that causes uplink interference to the micro cell.

With reference to the fourth aspect and the foregoing possible implementation manner, in another possible implementation manner, the uplink configuration information includes at least one of the following: timeslot format information of the uplink DPCCH, configuration information of an enhanced dedicated physical control channel (E-DPCCH), and configuration information of discontinuous sending; and the location information for determining the uplink DPCCH of the UE includes at least one of the following: a timing difference between the uplink DPCCH of the UE and a common pilot channel of the micro cell, and a timing difference between a downlink DPCCH of the UE and the common pilot channel of the micro cell.

With reference to the fourth aspect and the foregoing possible implementation manners, in another possible implementation manner, the macro cell node further includes:

a triggering unit, configured to trigger the sending unit to send the interference cancellation request under anyone of the following conditions: an interference management request sent by the micro cell node is received; or a periodic interference management request sent by the micro cell node is received; or it is determined that the UE causes uplink interference to the micro cell node.

With reference to the fourth aspect and the foregoing possible implementation manners, in another possible implementation manner, the macro cell node further includes:

a receiving unit, configured to receive, after the sending unit sends the interference cancellation request to the micro cell node, an interference cancellation response sent by the micro cell node; and an interference reducing unit, configured to perform, according to the interference cancellation response received by the receiving unit, an operation of further reducing interference.

With reference to the fourth aspect and the foregoing possible implementation manners, in another possible implementation manner, the macro cell node further includes:

a capability unit, configured to receive, before the sending unit sends the interference cancellation request to the micro cell node, capability information of supporting interference cancellation sent by the micro cell node; and the sending unit, further configured to perform the sending an interference cancellation request to a micro cell node in a case in which the micro cell node supports interference cancellation.

A fifth aspect of the present application provides an interference management system, including: a micro cell node and a macro cell node, where:

the micro cell node is configured to receive an interference cancellation request sent by the macro cell node, where the interference cancellation request includes uplink configuration information of a user equipment (UE), uplink scrambling code information of the UE, and location information for determining an uplink dedicated physical control channel (DPCCH) of the UE; and cancel interference according to the interference cancellation request; and the macro cell node is configured to send the interference cancellation request to the micro cell node, so that the micro cell node cancels interference according to the interference cancellation request.

A sixth aspect of the present application provides a micro cell node, including:

a receiver, configured to receive an interference cancellation request sent by a macro cell node, where the interference cancellation request includes uplink configuration information of a user equipment (UE), uplink scrambling code information of the UE, and location information for determining an uplink dedicated physical control channel (DPCCH) of the UE; and a processor, configured to cancel interference according to the interference cancellation request.

With reference to the sixth aspect, in a possible implementation manner, the processor is further configured to: detect, according to the uplink configuration information, the uplink scrambling code information of the UE, and the location information for determining the uplink DPCCH of the UE that are included in the interference cancellation request, an uplink signal of a UE corresponding to the interference cancellation request; and cancel the uplink signal of the UE corresponding to the interference cancellation request from received uplink signals.

With reference to the sixth aspect and the foregoing possible implementation manner, in another possible implementation manner, the UE is a UE that is determined by the macro cell node to cause uplink interference to a micro cell.

With reference to the sixth aspect and the foregoing possible implementation manners, in another possible implementation manner, the uplink configuration information includes at least one of the following: timeslot format information of the uplink DPCCH, configuration information of an enhanced dedicated physical control channel (E-DPCCH), and configuration information of discontinuous sending; and the location information for determining the uplink DPCCH of the UE includes at least one of the following: a timing difference between the uplink DPCCH of the UE and a common pilot channel of the micro cell, and a timing difference between a downlink DPCCH of the UE and the common pilot channel of the micro cell.

With reference to the sixth aspect and the foregoing possible implementation manners, in another possible implementation manner, the micro cell node further includes:

a transmitter, configured to send an interference management request and/or a periodic interference management request to the macro cell node before the receiver receives the interference cancellation request sent by the macro cell node, where:

the macro cell node triggers sending of the interference cancellation request under any one of the following conditions: the macro cell node receives the interference management request sent by the micro cell node; the macro cell node receives the periodic interference management request sent by the micro cell node; and the macro cell node determines that the UE causes uplink interference to the micro cell.

With reference to the sixth aspect and the foregoing possible implementation manners, in another possible implementation manner, the receiver is further configured to perform, when an uplink interference severity is higher than a predefined threshold, the cancelling the uplink signal of the UE from received uplink signals after the processor detects the uplink signal of the UE corresponding to the interference cancellation request.

With reference to the sixth aspect and the foregoing possible implementation manners, in another possible implementation manner, the transmitter is further configured to send an interference cancellation response to the macro cell node after the receiver receives the interference cancellation request sent by the macro cell node, so that the macro cell node performs, according to the interference cancellation response, an operation of further reducing interference.

With reference to the sixth aspect and the foregoing possible implementation manners, in another possible implementation manner, the transmitter is further configured to send, before the receiver receives the interference cancellation request sent by the macro cell node, capability information of supporting interference cancellation to the macro cell node.

A seventh aspect of the present application provides a macro cell node, including:

a transmitter, configured to send an interference cancellation request to a micro cell node, so that the micro cell node cancels interference according to the interference cancellation request, where:

the interference cancellation request includes uplink configuration information of a user equipment (UE), uplink scrambling code information of the UE, and location information for determining an uplink dedicated physical control channel (DPCCH) of the UE.

With reference to the seventh aspect, in a possible implementation manner, the transmitter is further configured to: determine a UE that causes uplink interference to a micro cell; and send the interference cancellation request to the micro cell node according to a result of the determining, where the interference cancellation request includes uplink configuration information of the UE that causes uplink interference to the micro cell, uplink scrambling code information of the UE that causes uplink interference to the micro cell, and location information for determining an uplink DPCCH of the UE that causes uplink interference to the micro cell.

With reference to the seventh aspect and the foregoing possible implementation manner, in another possible implementation manner, the uplink configuration information includes at least one of the following: timeslot format information of the uplink DPCCH, configuration information of an enhanced dedicated physical control channel (E-DPCCH), and configuration information of discontinuous sending; and the location information for determining the uplink DPCCH of the UE includes at least one of the following: a timing difference between the uplink DPCCH of the UE and a common pilot channel of the micro cell, and a timing difference between a downlink DPCCH of the UE and the common pilot channel of the micro cell.

With reference to the seventh aspect and the foregoing possible implementation manners, in another possible implementation manner, the transmitter triggers the sending unit to send the interference cancellation request under any one of the following conditions: an interference management request sent by the micro cell node is received; or a periodic interference management request sent by the micro cell node is received; or it is determined that the UE causes uplink interference to the micro cell.

With reference to the seventh aspect and the foregoing possible implementation manners, in another possible implementation manner, the macro cell node further includes:

a receiver, configured to receive, after the transmitter sends the interference cancellation request to the micro cell node, an interference cancellation response sent by the micro cell node; and a processor, configured to perform, according to the interference cancellation response received by the receiver, an operation of further reducing interference.

With reference to the seventh aspect and the foregoing possible implementation manners, in another possible implementation manner, the receiver is further configured to receive, before the transmitter sends the interference cancellation request to the micro cell node, capability information of supporting interference cancellation sent by the micro cell node; and the transmitter is further configured to perform the sending an interference cancellation request to a micro cell node in a case in which the micro cell node supports interference cancellation.

According to the uplink interference management method, node, and system provided in the embodiments of the present application, after receiving an interference cancellation request sent by a macro cell node, a micro cell node cancels an uplink signal of a corresponding macro cell UE according to information included in the interference cancellation request. Compared with the prior art, uplink interference caused by the macro cell UE to a micro cell can be cancelled when the macro cell UE enters an uplink coverage area of the micro cell, thereby improving an uplink capacity of the micro cell.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description merely show some embodiments of the present application, and persons of ordinary skill in the art may still derive other drawings from these accompanying drawings without creative efforts.

DETAILED DESCRIPTION

Figure 1:
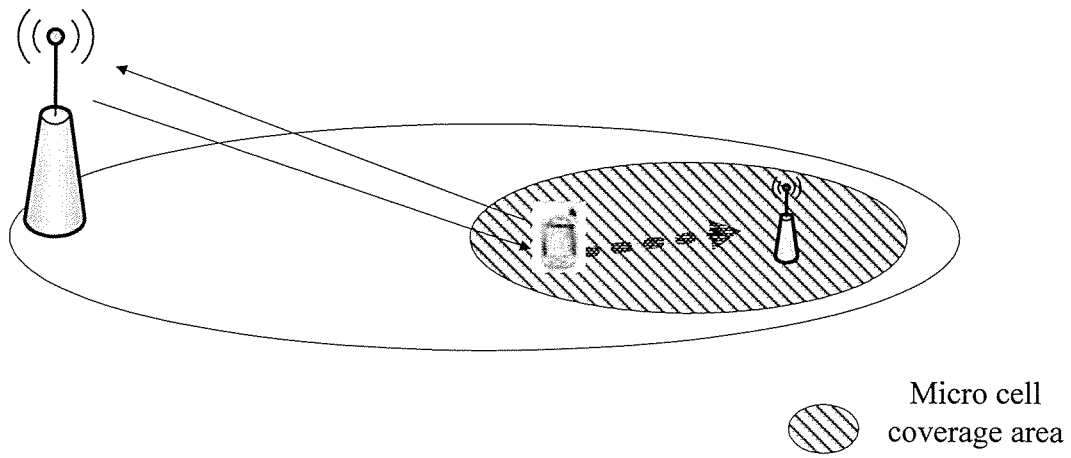
FIG. 1 is a schematic diagram of a Hetnet scenario in prior art.

The following description is intended to describe other than limit the present application. Specific details such as a specified system architecture, interface, and technology are provided to facilitate understanding of the present application. However, persons skilled in the art should understand that, the present application may be implemented in other embodiments without these specific details. In other circumstances, detailed description of an apparatus, a circuit, and a method that are well known are omitted in the interest of keeping the present application condensed.

Technologies described in this specification may be applied to various communications systems, for example, current 2G and 3 G communications systems and a next-generation communications system, for example, a global system for mobile communications (GSM) system, a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single-carrier FDMA (SC-FDMA) system, a general packet radio service (GPRS) system, a long term evolution (LTE) system, and other communications systems.

The present application is applicable to wireless network systems, such as a UMTS network, a GSM network, a GPRS network, a CDMA2000 network, a TD-SCDMA (Time Division Synchronous Code Division Multiple Access) network, an LTE network, a WLAN (Wireless Local Area Network)/WiFi (Wireless Fidelity) network, and a WiMAX (Worldwide Interoperability for Microwave Access) network, and in particular, applicable to a scenario in which micro cell base stations are deployed in these wireless network systems.

Various aspects are described in this specification with reference to a user equipment and/or a base station and/or a base station controller.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, a user device, or a user equipment.

The base station (that is, a node) may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base station (BTS) in GSM or CDMA, may also be a base station in WCDMA, and may further be an evolved NodeB (eNB, or e-NodeB) in the LTE, which is not limited in the present application.

The base station controller (that is, a control node) may be a base station controller (BSC) in GSM or CDMA, or a radio network controller (RNC) in WCDMA, which is not limited in the present application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 2:
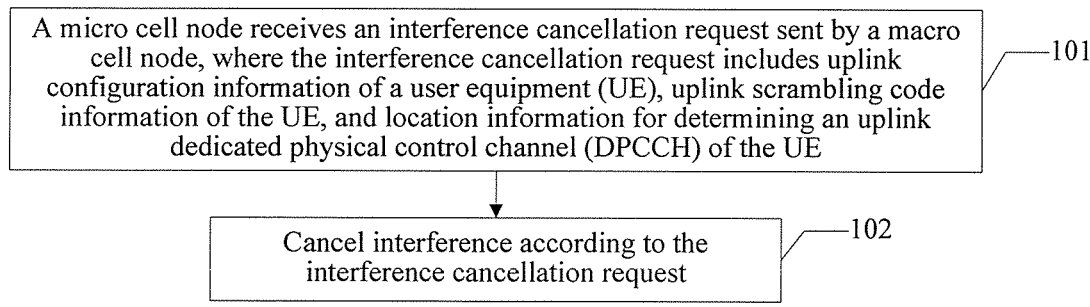
FIG. 2 is a flowchart of an uplink interference management method according to an embodiment of the present application.

An embodiment of the present application provides an uplink interference management method, which may be applied to a micro cell node side. As shown in FIG. 2, the method may include:

101. A micro cell node receives an interference cancellation request sent by a macro cell node, where the interference cancellation request includes uplink configuration information of a user equipment (UE), uplink scrambling code information of the UE, and location information for determining an uplink dedicated physical control channel (DPCCH) of the UE.

In the embodiment of the present application, the UE establishes a connection to the macro cell node and enters an uplink coverage range of the micro cell node, but the UE does not establish a connection to the micro cell node. That is, every UE described in the embodiment of the present application is a macro cell UE (that is, a UE that establishes a connection to a macro cell). The micro cell node can receive an uplink signal of the macro cell UE and meanwhile, the uplink signal of the macro cell UE is an interference signal for a micro cell. Therefore, the signal of the macro cell UE can be cancelled from received signals by using the method in the present application.

102. Cancel interference according to the interference cancellation request.

The interference cancellation request is corresponding to a UE in a connected state of the macro cell node, and the interference cancellation request includes uplink configuration information and uplink scrambling code information of a macro cell UE that accesses the macro cell node, and location information for determining an uplink DPCCH of the UE. The micro cell node can detect a corresponding UE according to such information, and cancel an uplink signal of the detected macro cell UE.

Alternatively, the interference cancellation request is corresponding to a macro cell UE that causes uplink interference to the micro cell, and the interference cancellation request includes only uplink configuration information and uplink scrambling code information of the macro cell UE that causes uplink interference to the micro cell, and location information for determining an uplink DPCCH of the UE. The micro cell node can detect a corresponding UE according to such information, and cancel an uplink signal of the detected macro cell UE.

According to the uplink interference management method provided in the embodiment of the present application, after receiving an interference cancellation request sent by a macro cell node, a micro cell node cancels an uplink signal of a corresponding macro cell UE according to information included in the interference cancellation request. Compared with the prior art, uplink interference caused by the macro cell UE to a micro cell can be cancelled when the macro cell UE enters an uplink coverage area of the micro cell, thereby improving an uplink capacity of the micro cell.

Figure 3:
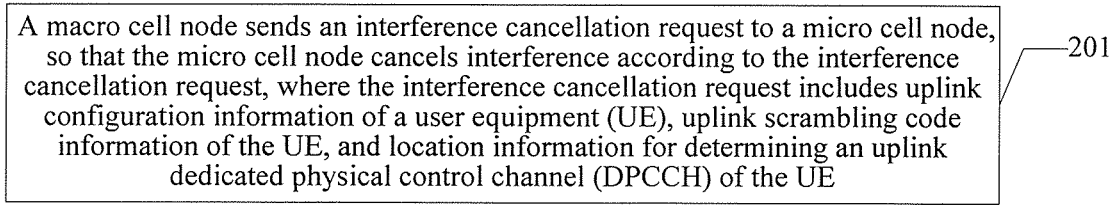
FIG. 3 is a flowchart of an uplink interference management method according to another embodiment of the present application.

Another embodiment of the present application provides an uplink interference management method, which may be applied to a macro cell node side. As shown in FIG. 3, the method may include:

201. A macro cell node sends an interference cancellation request to a micro cell node, so that the micro cell node cancels interference according to the interference cancellation request, where the interference cancellation request includes uplink configuration information of a user equipment (UE), uplink scrambling code information of the UE, and location information for determining an uplink dedicated physical control channel (DPCCH) of the UE.

Figure 4:
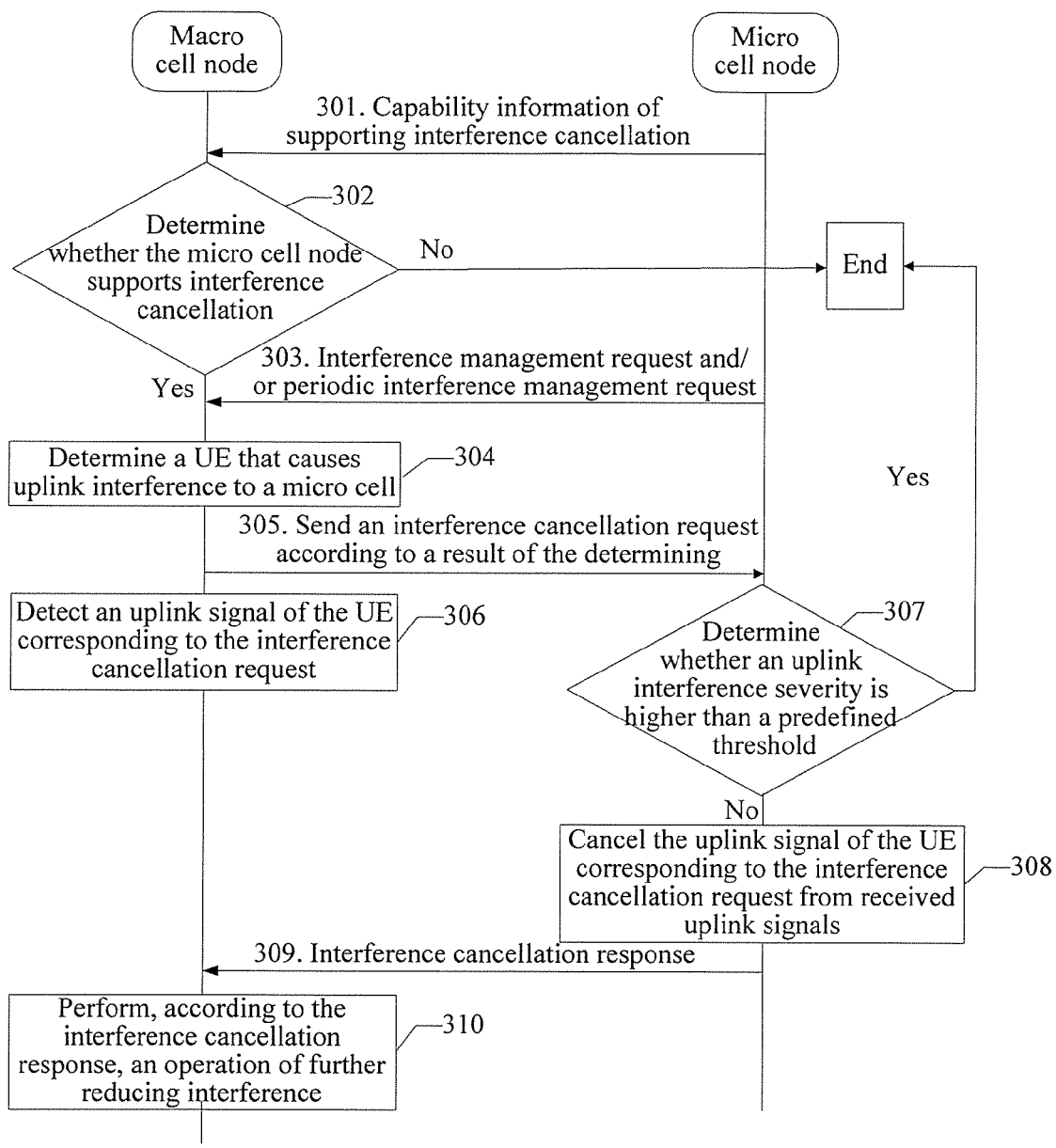
FIG. 4 is a flowchart of an uplink interference management method according to another embodiment of the present application.

Another embodiment of the present application further provides an uplink interference management method. As shown in FIG. 4, the method may include:

301. A micro cell node sends capability information of supporting interference cancellation to a macro cell node.

The micro cell node may report capability information about whether the micro cell node supports interference cancellation to the macro cell node. In this way, if the micro cell node does not have a capability of cancelling interference, the macro cell node does not need to perform an interference management operation such as determining a UE that causes uplink interference to a micro cell or sending an interference cancellation request. A case in which the micro cell node does not support interference cancellation may be: due to different equipment performance, the micro cell node may not have a capability of cancelling an uplink signal of a macro cell UE from received uplink signals; or interference cancellation of the micro cell node causes overload due to an interference cancellation operation that is being performed; or the like.

302. The macro cell node determines whether the micro cell node supports interference cancellation.

Steps 301 and 302 are optional steps, and the steps can be chosen to be performed according to an actual need and a power consumption requirement. Further optionally, steps 301 and 302 may also be performed after step 303. In a case in which the micro cell node supports interference cancellation, the macro cell node performs a subsequent interference management operation, for example, sending an interference cancellation request to the micro cell node. If the micro cell node does not support interference cancellation, the subsequent interference management operation can be cancelled, thereby reducing power consumption.

Further, the macro cell node may actively initiate an interference management process, or the micro cell node may trigger the interference management process. A specific step is as follows:

303. The micro cell node sends an interference management request and/or a periodic interference management request to the macro cell node.

A condition that the macro cell node is triggered to send the interference cancellation request to the micro cell node may be: the macro cell node receives an interference management request and/or a periodic interference management request sent by the micro cell node; or the macro cell node determines that the macro cell UE causes uplink interference to the micro cell.

Specifically, the interference management request may be an explicit indication that requires the macro cell node to initiate the interference management process. Alternatively, the interference management request may be an implicit indication, for example, a severity of uplink interference on the micro cell. When the uplink interference severity on the micro cell exceeds a predefined threshold, the micro cell node may send the interference management request to the macro cell node, so as to cancel the uplink interference caused by the macro cell UE. The uplink interference severity on the micro cell may be determined by the uplink interference caused by the macro cell UE or determined by uplink interference on the micro cell caused by all UEs. Alternatively, the interference management request may be a periodic management request, and the interference management request is periodically initiated to the macro cell node, so as to reduce uplink interference on the micro cell.

Alternatively, step 303 may be not performed. When the macro cell node determines that the macro cell UE causes uplink interference to the micro cell, the interference management process is triggered. For example, a UE may locate a position of the UE; when the UE enters an uplink coverage range of the micro cell, an indication that uplink interference is caused to the micro cell is reported to the macro cell. In this way, the macro cell node can determine that the macro cell UE causes uplink interference to the micro cell and initiate the interference management process.

Further, a workload of detecting uplink signals of all macro cell UEs and eliminating uplink interference caused by all macro cell UEs by the micro cell node is relatively heavy. To reduce the workload of the micro cell node, a range of macro cell UEs that need to be detected by the micro cell node may be narrowed. Therefore, a UE corresponding to the interference cancellation request may also be a UE that is determined by the macro cell node to cause uplink interference to the micro cell.

304. The macro cell node determines a UE that causes uplink interference to the micro cell.

The macro cell node may determine, according to location information reported by the UE or the UE-reported indication that uplink interference is caused to the micro cell, the UE that causes uplink interference to the micro cell. For example, when the UE detects that signal quality of an adjacent micro cell is higher than a certain threshold, the indication that uplink interference is caused to the micro cell may be reported to the macro cell.

305. The macro cell node sends an interference cancellation request to the micro cell node according to a result of the determining.

In this embodiment, step 304 is an optional step. If step 304 is not performed, step 305 may be replaced with the following step: The macro cell node sends an interference cancellation request to the micro cell node. In this way, the interference cancellation request may include information corresponding to a macro cell UE that causes interference and a macro cell UE that does not cause interference to the micro cell, including: uplink configuration information of the UEs, uplink scrambling code information of the UEs, and location information for determining uplink DPCCHs of the UEs.

By performing step 304, the macro cell UE that causes uplink interference to the micro cell may be determined. Therefore, in step 305, the interference cancellation request may not include related information of the macro cell UE that does not cause interference to the micro cell but include only information corresponding to the UE that causes uplink interference to the micro cell. The interference cancellation request may include the uplink configuration information of the UE that causes uplink interference to the micro cell, the uplink scrambling code information of the LTE that causes uplink interference to the micro cell, and the location information for determining the uplink DPCCH of the UE that causes uplink interference to the micro cell.

306. Detect, according to uplink configuration information, uplink scrambling code information of the UE, and location information for determining an uplink DPCCH of the UE that are included in the interference cancellation request, an uplink signal of the UE corresponding to the interference cancellation request.

The location information for determining the uplink DPCCH of the UE includes at least one of the following: a timing difference between the uplink DPCCH of the UE and a common pilot channel of the micro cell, and a timing difference between a downlink DPCCH of the UE and the common pilot channel of the micro cell. The uplink configuration information includes at least one of the following: timeslot format information of the uplink DPCCH, configuration information of an enhanced dedicated physical control channel (E-DPCCH), and configuration information of discontinuous sending. In addition, an interference cancellation message may further include other optional configuration information. For optional parameters of the configuration information and specific meanings of the parameters, reference may be made to Table 1.

TABLE 1

| | |
|---|---|
| Continuous Packet Connectivity DTX Information | Configuration information of uplink discontinuous sending |
| UL DPCH Information | Configuration information of an uplink dedicated physical control channel |
| >UL Scrambling Code | Uplink scrambling code |
| >Min UL Channelization Code Length | Minimum uplink channelization code length |
| >Max Number of UL DPDCHs | Maximum number of uplink DPDCH channels |
| >Puncture Limit | Puncture limit |
| >TFCS | Transport format combination set |
| >UL DPCCH Slot Format | Uplink DPCCH timeslot format |
| >UL SIR Target | Uplink target signal-to-noise ratio |
| >Diversity Mode | Diversity mode |
| >DPC Mode | DPC mode |
| >UL DPDCH Indicator For E-DCH Operation | Uplink DPDCH indicator for an E-DCH operation |
| >UARFCN | Frequency channel number information |
| >Frequency Band Indicator | Frequency band indicator information |
| RL Information | Configuration information of discontinuous sending |
| >RL ID | Radio link identifier |

TABLE 1-continued

| | |
|---|---|
| >First RLS Indicator | First radio link set indicator |
| >Frame Offset | Offset between a downlink DPCCH and a common pilot frame of a micro cell |
| >Chip Offset | Intra-frame offset |
| >Propagation Delay | Propagation delay |
| >E-DCH RL Indication | Link indication of an enhanced DCH |
| E-DPCH Information | Configuration information of an enhanced dedicated physical control channel |
| >Maximum Set of E-DPDCHs | Maximum set of E-DPCCHs |
| >Puncture Limit | Puncture limit |
| >E-TFCS Information | Information about an enhanced transport format combination set |
| >E-TTI | Transmission time interval of an enhanced dedicated physical channel |
| >E-DPCCH Power Offset | E-DPCCH power offset |
| >E-RGCH 2-Index-Step Threshold | Index step E-RGCH 2-Index-Step for determining service authorization |
| >E-RGCH 3-Index-Step Threshold | Index step E-RGCH 3-Index-Step for determining service authorization |
| >HARQ Info for E-DCH | Redundancy version information sent by using an HARQ of an E-DCH |
| >HS-DSCH Configured Indicator | Configuration indicator for a high speed downlink shared channel |
| >E-RNTI | CRC identifier used on an E-AGCH |
| >Minimum Reduced E-DPDCH Gain Factor | Minimum gain factor |
| Additional E-DCH FDD Information | Additional E-DCH configuration information |
| >UL Scrambling Code | Uplink scrambling code |
| >E-DCH Additional RL ID | Radio link identifier |
| >First RLS Indicator | First radio link set indicator |
| >Propagation Delay | Propagation delay |
| >E-RNTI | UE identifier |
| >Extended Propagation Delay | Propagation delay between a UE and a base station |

Further, to reduce interference cancellation load of the micro cell node, the following step 307 may be performed before the uplink signal of the macro cell UE is detected. Whether to cancel interference is determined according to the uplink interference severity, so as to reduce the workload of the micro cell node when the interference severity is relatively low, thereby reducing the power consumption.

307. The micro cell node determines whether an uplink interference severity is higher than a predefined threshold. When the uplink interference severity is higher than the predefined threshold, 308 is performed; when the uplink interference severity is not higher than the predefined threshold, the interference management process may be cancelled, or step 309 may be continued to be performed.

That the uplink interference severity on the micro cell node is higher than the predefined threshold may be that an uplink interference severity caused by the UE corresponding to the interference cancellation request is higher than the predefined threshold, or may be that an uplink interference severity caused by all the macro cell UEs is higher than the predefined threshold, or may be that an uplink interference severity caused by UEs of all adjacent cells is higher than the predefined threshold.

308. The micro cell node cancels the uplink signal of the UE corresponding to the interference cancellation request from received uplink signals.

Further optionally, the method in this embodiment may further include the following steps 309 and 310. The micro cell node reports a processing situation after receiving the interference cancellation request to the macro cell node, so that the macro cell node determines a subsequent operation after learning the processing situation of the interference cancellation request, thereby avoiding a problem such as repeated sending by the macro cell node.

309. The micro cell node sends an interference cancellation response to the macro cell node.

The interference cancellation response may indicate that the interference cancellation request has been received, indicate that an interference cancellation operation is being performed, indicate that interference cancellation has been completed, indicate that no UE corresponding to the interference cancellation request is detected, indicate that interference cancellation is not supported, indicate that interference cancellation has been beyond system load, or the like. Therefore, step 309 may be performed after step 305 in which the interference cancellation request sent by the macro cell node is received, or after 306, 307, or 308 is completed, or during a processing process of 306, 307, or 308, which is not limited in the embodiment of the present invention.

310. The macro cell node performs, according to the interference cancellation response, an operation of further reducing interference.

If the interference cancellation response indicates that the interference cancellation request has been received, the macro cell node may not repeatedly send the interference cancellation request any longer. If the interference cancellation response indicates that the micro cell node does not have the capability of cancelling interference, that no UE corresponding to the interference cancellation request is detected, or that interference cancellation has been beyond system load, the macro cell node may continue to perform the operation of further reducing interference. For example, the UE that causes uplink interference to the micro cell is handed over to another frequency, or a time division resource occupied by the macro cell UE is isolated from a time division resource occupied by the micro cell UE by using time division scheduling, or an uplink transmit power of the macro cell UE is reduced.

It should be noted that the embodiment of the present application may be applied to various Hetnet architectures, including a scenario in which the macro cell node and the micro cell node belong to a same control node, or a scenario in which the two nodes do not belong to a same control node, for example, a scenario in which a control node to which the micro cell node belongs is a base station gateway and a control node to which the macro cell node belongs is a radio network controller of the macro cell. A message and a request between the macro cell node and the micro cell node may be forwarded through an intermediate device, such as a base station gateway and an RNC. Similarly, the embodiment of the present application may be further applied to other Hetnet architectures. Examples are not provided one by one in this embodiment.

In the uplink interference management method provided in the embodiment of the present application, a macro cell node sends an interference cancellation request to a micro cell node, so that after receiving the interference cancellation request sent by the macro cell node, the micro cell node can cancel an uplink signal of a corresponding macro cell UE according to information included in the interference cancellation request. Compared with the prior art, uplink interference caused by the macro cell UE to a micro cell can be cancelled when the macro cell UE enters an uplink coverage area of the micro cell, thereby improving an uplink capacity of the micro cell.

In addition, before sending the interference cancellation request, the macro cell node first determines a UE that causes uplink interference to the micro cell to narrow down a range of UEs for which interference cancellation needs to be performed, which not only reduces an amount of information included in the interference cancellation request but also reduces interference cancellation load on the micro cell node.

Figure 5:
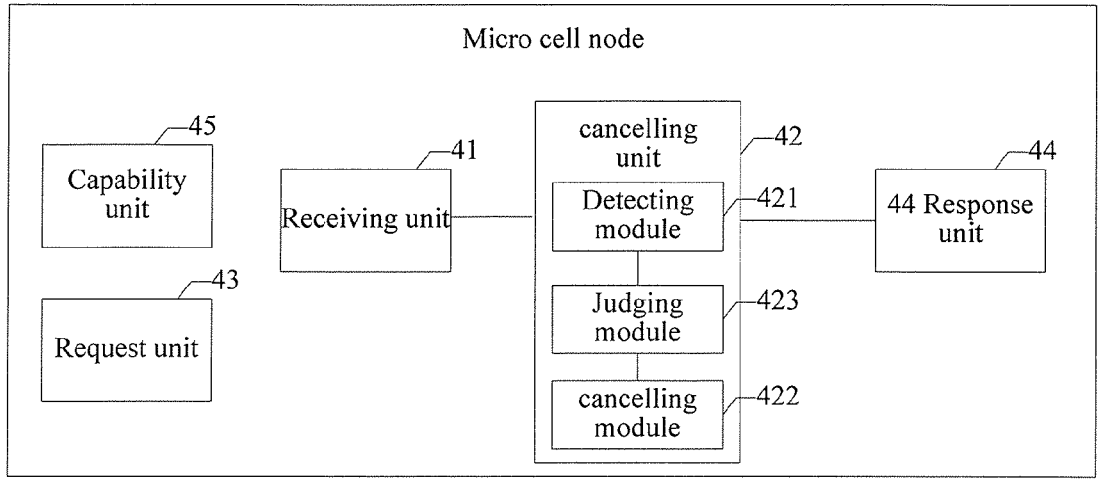
FIG. 5 is a schematic diagram of composition of a micro cell node according to another embodiment of the present application.

Another embodiment of the present application further provides a micro cell node. As shown in FIG. 5, the micro cell node includes a receiving unit 41 and a cancelling unit 42.

The receiving unit 41 is configured to receive an interference cancellation request sent by a macro cell node, where the interference cancellation request includes uplink configuration information of a user equipment (UE), uplink scrambling code information of the UE, and location information for determining an uplink dedicated physical control channel (DPCCH) of the UE.

The cancelling unit 42 is configured to cancel interference according to the interference cancellation request received by the receiving unit 41.

Further, the cancelling unit 42 includes a detecting module 421 and a cancelling module 422.

The detecting module 421 is configured to detect, according to the uplink configuration information, the uplink scrambling code information of the UE, and the location information for determining the uplink DPCCH of the UE that are included in the interference cancellation request, an uplink signal of the UE corresponding to the interference cancellation request.

The cancelling module 422 is configured to cancel the uplink signal of the UE corresponding to the interference cancellation request from received uplink signals.

The uplink configuration information includes at least one of the following: timeslot format information of the uplink DPCCH, configuration information of an enhanced dedicated physical control channel (E-DPCCH), and configuration information of discontinuous sending. The location information for determining the uplink DPCCH of the UE includes at least one of the following: a timing difference between the uplink DPCCH of the UE and a common pilot channel of a micro cell, and a timing difference between a downlink DPCCH of the UE and the common pilot channel of the micro cell.

Further, the UE is a UE that is determined by the macro cell node to cause uplink interference to the micro cell.

Further, the micro cell node may further include a request unit 43.

The request unit 43 is configured to send an interference management request and/or a periodic interference management request to the macro cell node before the receiving unit 41 receives the interference cancellation request sent by the macro cell node.

The macro cell node triggers sending of the interference cancellation request under any one of the following conditions: the macro cell node receives the interference management request sent by the micro cell node; the macro cell node receives the periodic interference management request sent by the micro cell node; and the macro cell node determines that the UE causes uplink interference to the micro cell.

Further, the cancelling unit 42 may further include a judging module 423.

The judging module 423 is configured to trigger, when an uplink interference severity is higher than a predefined threshold, the cancelling module 422 to perform the cancelling the uplink signal of the UE from received uplink signals after the detecting module 421 detects the uplink signal of the UE corresponding to the interference cancellation request.

Further, the micro cell node may further include a response unit 44.

The response unit 44 is configured to send an interference cancellation response to the macro cell node after the receiving unit 41 receives the interference cancellation request sent by the macro cell node, so that the macro cell node performs, according to the interference cancellation response, an operation of further reducing interference.

Further, the micro cell node may further include a capability unit 45.

The capability unit 45 is configured to send capability information of supporting interference cancellation to the macro cell node before the receiving unit 41 receives the interference cancellation request sent by the macro cell node, so that the macro cell node sends the interference cancellation request to the micro cell node in a case in which the micro cell node supports interference cancellation.

Figure 6:
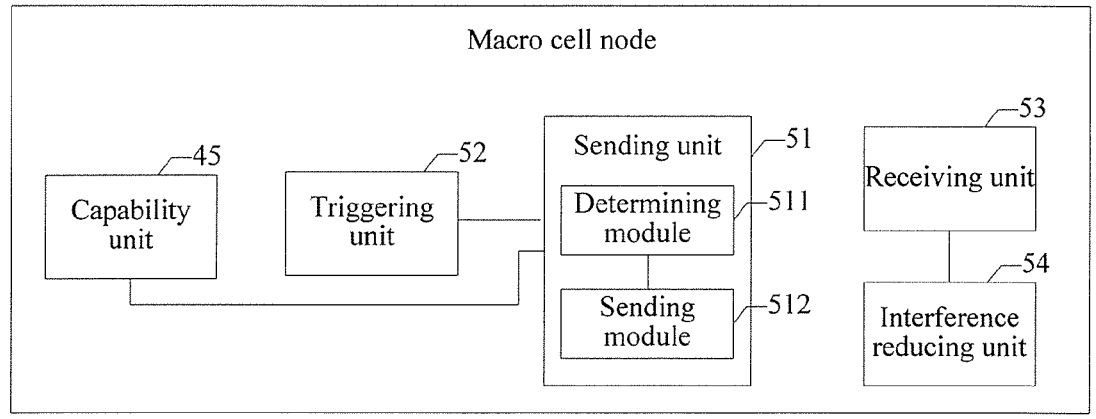
FIG. 6 is a schematic diagram of composition of a macro cell node according to another embodiment of the present application.

Another embodiment of the present application further provides a macro cell node. As shown in FIG. 6, the macro cell node includes a sending unit 51.

The sending unit 51 is configured to send an interference cancellation request to a micro cell node, so that the micro cell node cancels interference according to the interference cancellation request.

The interference cancellation request includes uplink configuration information of a user equipment (UE), uplink scrambling code information of the UE, and location information for determining an uplink dedicated physical control channel (DPCCH) of the UE.

Further, the sending unit 51 includes a determining module 511 and a sending module 512.

The determining module 511 is configured to determine a UE that causes uplink interference to a micro cell.

The sending module 512 is configured to send the interference cancellation request to the micro cell node according to a result of the determining obtained by the determining module 511, where the interference cancellation request includes uplink configuration information of the UE that causes uplink interference to the micro cell, uplink scrambling code information of the UE that causes uplink interference to the micro cell, and location information for determining the uplink DPCCH of the UE that causes uplink interference to the micro cell.

The uplink configuration information includes at least one of the following: timeslot format information of the uplink DPCCH, configuration information of an enhanced dedicated physical control channel (E-DPCCH), and configuration information of discontinuous sending. The location information for determining the uplink DPCCH of the UE includes at least one of the following: a timing difference between the uplink DPCCH of the UE and a common pilot channel of the micro cell, and a timing difference between a downlink DPCCH of the UE and the common pilot channel of the micro cell.

Further, the macro cell node may further include a triggering unit 52.

The triggering unit 52 is configured to trigger the sending unit 51 to send the interference cancellation request under any one of the following conditions: an interference management request sent by the micro cell node is received; or aperiodic interference management request sent by the micro cell node is received; or it is determined that the UE causes uplink interference to the micro cell node.

Further, the macro cell node further includes a receiving unit 53 and an interference reducing unit 54.

The receiving unit 53 is configured to receive, after the sending unit 51 sends the interference cancellation request to the micro cell node, an interference cancellation response sent by the micro cell node.

The interference reducing unit 54 is configured to perform, according to the interference cancellation response received by the receiving unit 53, an operation of further reducing interference.

Further, the macro cell node further includes a capability unit 55.

The capability unit 55 is configured to receive, before the sending unit 51 sends the interference cancellation request to the micro cell node, capability information of supporting interference cancellation sent by the micro cell node.

The sending unit 51 is further configured to perform the sending an interference cancellation request to a micro cell node in a case in which the micro cell node supports interference cancellation.

Another embodiment of the present application further provides an uplink interference management system. Reference may be made to an architecture shown in FIG. 4. The system may include a macro cell node and a micro cell node.

The macro cell node is configured to send an interference cancellation request to the micro cell node, so that the micro cell node cancels interference according to the interference cancellation request, where the interference cancellation request includes uplink configuration information of a user equipment (UE), uplink scrambling code information of the UE, and location information for determining an uplink dedicated physical control channel (DPCCH) of the UE.

The micro cell node is configured to receive the interference cancellation request sent by the macro cell node, where the interference cancellation request includes the uplink configuration information of the user equipment (UE), the uplink scrambling code information of the UE, and the location information for determining the uplink dedicated physical control channel (DPCCH) of the UE; and cancel the interference according to the interference cancellation request.

According to the micro cell node, the macro cell node, and the uplink interference management system that are provided in the embodiment of the present application, the macro cell node sends an interference cancellation request to the micro cell node, so that after receiving the interference cancellation request sent by the macro cell node, the micro cell node cancels an uplink signal of a corresponding macro cell UE according to information included in the interference cancellation request. Compared with the prior art, uplink interference caused by the macro cell UE to a micro cell can be cancelled when the macro cell UE enters an uplink coverage area of the micro cell, thereby improving an uplink capacity of the micro cell.

Figure 7:
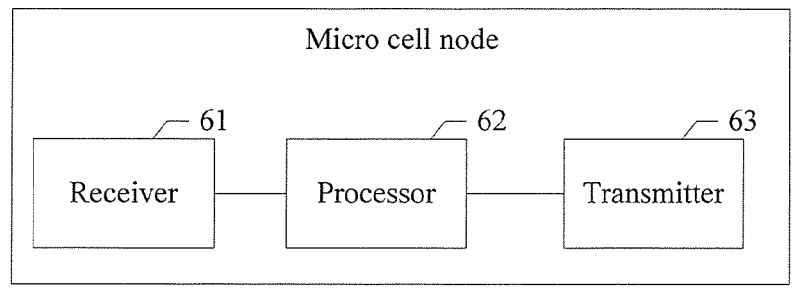
FIG. 7 is a schematic diagram of composition of a micro cell node according to another embodiment of the present application.

Another embodiment of the present application further provides a micro cell node. As shown in FIG. 7, the micro cell node includes a receiver 61 and a processor 62.

The receiver 61 is configured to receive an interference cancellation request sent by a macro cell node, where the interference cancellation request includes uplink configuration information of a user equipment (UE), uplink scrambling code information of the UE, and location information for determining an uplink dedicated physical control channel (DPCCH) of the UE.

The processor 62 is configured to cancel interference according to the interference cancellation request.

Further, the processor 62 is further configured to: detect, according to the uplink configuration information, the uplink scrambling code information of the UE, and the location information for determining the uplink DPCCH of the UE that are included in the interference cancellation request, an uplink signal of the UE corresponding to the interference cancellation request; and cancel the uplink signal of the UE corresponding to the interference cancellation request from received uplink signals.

Further, the UE is a UE that is determined by the macro cell node to cause uplink interference to a micro cell.

The uplink configuration information includes at least one of the following: timeslot format information of the uplink DPCCH, configuration information of an enhanced dedicated physical control channel (E-DPCCH), and configuration information of discontinuous sending. The location information for determining the uplink DPCCH of the UE includes at least one of the following: a timing difference between the uplink DPCCH of the UE and a common pilot channel of the micro cell, and a timing difference between a downlink DPCCH of the UE and the common pilot channel of the micro cell.

Further, the micro cell node further includes a transmitter 63.

The transmitter 63 is configured to send an interference management request and/or a periodic interference management request to the macro cell node before the receiver 61 receives the interference cancellation request sent by the macro cell node.

The macro cell node triggers sending of the interference cancellation request under any one of the following conditions: the macro cell node receives the interference management request sent by the micro cell node; the macro cell node receives the periodic interference management request sent by the micro cell node; and the macro cell node determines that the UE causes uplink interference to the micro cell.

Further, the receiver 61 is further configured to perform, when an uplink interference severity is higher than a predefined threshold, the cancelling the uplink signal of the UE from received uplink signals after the processor 62 detects the uplink signal of the UE corresponding to the interference cancellation request.

Further, the transmitter 63 is further configured to send an interference cancellation response to the macro cell node after the receiver 61 receives the interference cancellation request sent by the macro cell node, so that the macro cell node performs, according to the interference cancellation response, an operation of further reducing interference.

Further, the transmitter 63 is further configured to send, before the receiver 61 receives the interference cancellation request sent by the macro cell node, capability information of supporting interference cancellation to the macro cell node, so that the macro cell node sends the interference cancellation request to the micro cell node in a case in which the micro cell node supports interference cancellation.

Figure 8:
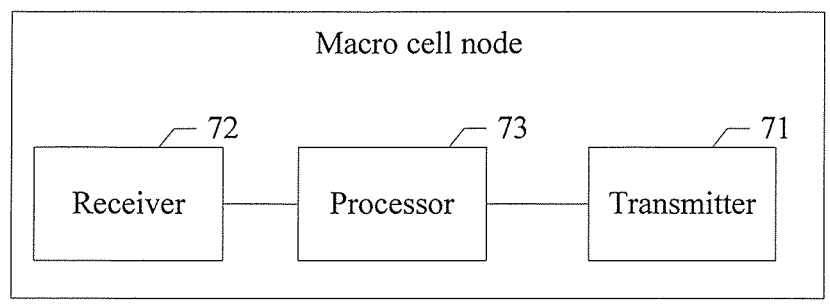
FIG. 8 is a schematic diagram of composition of a macro cell node according to another embodiment of the present application.

Another embodiment of the present application further provides a macro cell node. As shown in FIG. 8, the macro cell node includes a transmitter 71.

The transmitter 71 is configured to send an interference cancellation request to a micro cell node, so that the micro cell node cancels interference according to the interference cancellation request.

The interference cancellation request includes uplink configuration information of a user equipment (UE), uplink scrambling code information of the UE, and location information for determining an uplink dedicated physical control channel (DPCCH) of the UE.

Further, the transmitter 71 is further configured to: determine a UE that causes uplink interference to a micro cell; and send the interference cancellation request to the micro cell node according to a result of the determining, where the interference cancellation request includes uplink configuration information of the UE that causes uplink interference to the micro cell, uplink scrambling code information of the UE that causes uplink interference to the micro cell, and location information for determining an uplink DPCCH of the UE that causes uplink interference to the micro cell.

Further, the uplink configuration information includes at least one of the following: timeslot format information of the uplink DPCCH, configuration information of an enhanced dedicated physical control channel (E-DPCCH), and configuration information of discontinuous sending. The location information for determining the uplink DPCCH of the UE includes at least one of the following: a timing difference between the uplink DPCCH of the UE and a common pilot channel of the micro cell, and a timing difference between a downlink DPCCH of the UE and the common pilot channel of the micro cell.

Further, the transmitter 71 is further configured to send the interference cancellation request under any one of the following conditions: an interference management request sent by the micro cell node is received; or a periodic interference management request sent by the micro cell node is received; or it is determined that the UE causes uplink interference to the micro cell node.

Further, the macro cell node further includes a receiver 72 and a processor 73.

The receiver 72 is configured to receive, after the transmitter 71 sends the interference cancellation request to the micro cell node, an interference cancellation response sent by the micro cell node.

The processor 73 is configured to perform, according to the interference cancellation response received by the receiver 72, an operation of further reducing interference.

Further, the receiver 72 is further configured to receive, before the transmitter 71 sends the interference cancellation request to the micro cell node, capability information of supporting interference cancellation sent by the micro cell node.

The transmitter 71 is further configured to perform the sending an interference cancellation request to a micro cell node in a case in which the micro cell node supports interference cancellation.

According to the micro cell node and the macro cell node that are provided in the embodiment of the present application, the macro cell node sends an interference cancellation request to the micro cell node, so that after receiving the interference cancellation request sent by the macro cell node, the micro cell node cancels an uplink signal of a corresponding macro cell UE according to information included in the interference cancellation request. Compared with the prior art, uplink interference caused by the macro cell UE to a micro cell can be cancelled when the macro cell UE enters an uplink coverage area of the micro cell, thereby improving an uplink capacity of the micro cell.

It may be clearly understood by persons skilled in the art that, for the purpose of convenient and brief description, division of the foregoing functional modules is merely used as an example, and the foregoing functions may be assigned to different functional modules according to an actual need, that is, internal structure of the apparatus is divided into different functional modules, to complete all or a part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from scope of the technical solutions of the embodiments of the present application.

What is claimed is:

1. An uplink interference management method, comprising:
receiving, by a micro cell node, an interference cancellation request sent by a macro cell node, wherein the interference cancellation request comprises uplink configuration information of a user equipment (UE), uplink scrambling code information of the UE, and location information for determining an uplink dedicated physical control channel (DPCCH) of the UE; and
cancelling interference according to the interference cancellation request,
wherein the uplink configuration information comprises at least one of: timeslot format information of the uplink DPCCH, configuration information of an enhanced dedicated physical control channel (E-DPCCH), or configuration information of discontinuous sending, and
wherein the location information for determining the uplink DPCCH of the UE comprises at least one: a timing difference between the uplink DPCCH of the UE and a common pilot channel of the micro cell, or a timing difference between a downlink DPCCH of the UE and the common pilot channel of the micro cell.

2. The method according to claim 1, further comprising:
detecting, according to the uplink configuration information, the uplink scrambling code information of the UE, and the location information for determining the uplink DPCCH of the UE that are comprised in the interference cancellation request, an uplink signal of the UE corresponding to the interference cancellation request; and
cancelling the uplink signal of the UE corresponding to the interference cancellation request from received uplink signals.

3. The method according to claim 2, wherein after detecting the uplink signal of the UE corresponding to the interference cancellation request, the method further comprises:
performing, when an uplink interference severity is higher than a predefined threshold, the cancelling the uplink signal of the UE from received uplink signals.

4. The method according to claim 1, wherein the UE is a UE that is determined by the macro cell node to cause uplink interference to a micro cell.

5. The method according to claim 1, wherein before receiving the interference cancellation request sent by the macro cell node, the method further comprises:
sending at least one of an interference management request or a periodic interference management request to the macro cell node,
wherein the interference cancellation request is sent in response to any one of the following conditions:
the macro cell node receives the interference management request sent by the micro cell node;
the macro cell node receives the periodic interference management request sent by the micro cell node; or
the macro cell node determines that the UE causes uplink interference to the micro cell.

6. An uplink interference management method, comprising:
sending, by a macro cell node, an interference cancellation request to a micro cell node for cancelling interference according to the interference cancellation request,
wherein the interference cancellation request comprises uplink configuration information of a user equipment (UE), uplink scrambling code information of the UE, and location information for determining an uplink dedicated physical control channel (DPCCH) of the UE,
wherein the uplink configuration information comprises at least one of: timeslot format information of the uplink DPCCH, configuration information of an enhanced dedicated physical control channel (E-DP-CCH), or configuration information of discontinuous sending, and wherein the location information for determining the uplink DPCCH of the UE comprises at least one: a timing difference between the uplink DPCCH of the UE and a common pilot channel of the micro cell, or a timing difference between a downlink DPCCH of the UE and the common pilot channel of the micro cell.

7. The method according to claim 6, further comprising:
determining a UE that causes uplink interference to a micro cell; and
sending the interference cancellation request to the micro cell node according to a result of the determining, wherein the interference cancellation request comprises uplink configuration information of the UE that causes uplink interference to the micro cell, uplink scrambling code information of the UE that causes uplink interference to the micro cell, and location information for determining an uplink DPCCH of the UE that causes uplink interference to the micro cell.

8. The method according to claim 7, wherein the interference cancellation request is sent in response to any one of the following cases:
an interference management request sent by the micro cell node is received;
a periodic interference management request sent by the micro cell node is received; or
it is determined that the UE causes uplink interference to the micro cell.

9. A micro cell node, comprising:
a receiver, configured to receive an interference cancellation request sent by a macro cell node, wherein the interference cancellation request comprises uplink configuration information of a user equipment (UE), uplink scrambling code information of the UE, and location information for determining an uplink dedicated physical control channel (DPCCH) of the UE; and
a processor, configured to cancel interference according to the interference cancellation request,
wherein the uplink configuration information comprises at least one of: timeslot format information of the uplink DPCCH, configuration information of an enhanced dedicated physical control channel (E-DP-CCH), or configuration information of discontinuous sending, and
wherein the location information for deter mining the uplink DPCCH of the UE comprises at least one: a timing difference between the uplink DPCCH of the UE and a common pilot channel of the micro cell, or a timing difference between a downlink DPCCH of the UE and the common pilot channel of the micro cell.

10. The micro cell node according to claim 9, wherein the processor is further configured to:
detect, according to the uplink configuration information, the uplink scrambling code information of the UE and the location information for determining the uplink DPCCH of the UE that are comprised in the interference cancellation request, an uplink signal of the UE corresponding to the interference cancellation request; and
cancel the uplink signal of the UE corresponding to the interference cancellation request from received uplink signals.

11. The micro cell node according to claim 10, wherein the processor is further configured to cancel, when an uplink interference severity is higher than a predefined threshold, the uplink signal of the UE from received uplink signals after the processor detects the uplink signal of the UE corresponding to the interference cancellation request.

12. The micro cell node according to claim 9, wherein the UE is a UE that is determined by the macro cell node to cause uplink interference to a micro cell.

13. The micro cell node according to claim 9, further comprising:
a transmitter, configured to send at least one of an interference management request or a periodic interference management request to the macro cell node before the receiver receives the interference cancellation request sent by the macro cell node,
wherein the transmitter is configured to send the interference cancellation request in response to any one of the following conditions:
the macro cell node receives the interference management request sent by the micro cell node;
the macro cell node receives the periodic interference management request sent by the micro cell node; or
the macro cell node determines that the UE causes uplink interference to the micro cell.

14. A macro cell node, comprising:
a transmitter, configured to send an interference cancellation request to a micro cell node cancelling interference according to the interference cancellation request,
wherein the interference cancellation request comprises uplink configuration information of a user equipment (UE), uplink scrambling code information of the UE, and location information for determining an uplink dedicated physical control channel (DPCCH) of the UE,
wherein the uplink configuration information comprises at least one of: timeslot format information of the uplink DPCCH, configuration information of an enhanced dedicated physical control channel (E-DP-CCH), or configuration information of discontinuous sending, and
wherein the location information for determining the uplink DPCCH of the UE comprises at least one: a timing difference between the uplink DPCCH of the UE and a common pilot channel of the micro cell, or a timing difference between a downlink DPCCH of the UE and the common pilot channel of the micro cell.

15. The macro cell node according to claim 14, further comprising:
a processor configured to determine a UE that causes uplink interference to a micro cell;
wherein the transmitter is further configured to send the interference cancellation request to the micro cell node according to a result of the determining, wherein the interference cancellation request comprises uplink configuration information of the UE that causes uplink interference to the micro cell, uplink scrambling code information of the UE that causes uplink interference to the micro cell, and location information for determining an uplink DPCCH of the UE that causes uplink interference to the micro cell.

16. The macro cell node according to claim 14, wherein the transmitter is further configured to send the interference cancellation request in response to any one of the following conditions:
an interference management request sent by the micro cell node is received;

a periodic interference management request sent by the micro cell node is received; or it is determined that the UE causes uplink interference to the micro cell node.

* * * * *